United States Patent
Takai et al.

(10) Patent No.: US 12,358,841 B2
(45) Date of Patent: Jul. 15, 2025

(54) STABILIZED ZIRCONIA SINTERED BODY AND ZIRCONIA POWDER

(71) Applicant: DAIICHI KIGENSO KAGAKU KOGYO CO., LTD., Osaka (JP)

(72) Inventors: Masayuki Takai, Osaka (JP); Keita Kanenishi, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 260 days.

(21) Appl. No.: 17/767,376

(22) PCT Filed: Jan. 12, 2021

(86) PCT No.: PCT/JP2021/000656
§ 371 (c)(1),
(2) Date: Apr. 7, 2022

(87) PCT Pub. No.: WO2021/153211
PCT Pub. Date: Aug. 5, 2021

(65) Prior Publication Data
US 2024/0101482 A1 Mar. 28, 2024

(30) Foreign Application Priority Data
Jan. 27, 2020 (JP) .................................. 2020-011107

(51) Int. Cl.
*C04B 35/488* (2006.01)
*C04B 35/49* (2006.01)
*C09K 11/02* (2006.01)
*C09K 11/67* (2006.01)

(52) U.S. Cl.
CPC .......... *C04B 35/4885* (2013.01); *C04B 35/49* (2013.01); *C09K 11/02* (2013.01); *C09K 11/67* (2013.01); *C09K 11/671* (2013.01); *C04B 2235/3217* (2013.01); *C04B 2235/3246* (2013.01); *C04B 2235/3249* (2013.01); *C04B 2235/5436* (2013.01); *C04B 2235/5454* (2013.01); *C04B 2235/77* (2013.01); *C04B 2235/781* (2013.01); *C04B 2235/9646* (2013.01)

(58) Field of Classification Search
CPC ....... C09K 11/02; C09K 11/671; C09K 11/67; C04B 35/4885; C04B 35/49; C04B 2235/3217; C04B 2235/3246; C04B 2235/3249; C04B 2235/5436; C04B 2235/5454; C04B 2235/77; C04B 2235/781; C04B 2235/9646
See application file for complete search history.

(56) References Cited

U.S. PATENT DOCUMENTS

| | | | | |
|---|---|---|---|---|
| 2012/0012789 A1* | 1/2012 | Yamada | ................. | C04B 35/488 |
| | | | | 252/301.4 F |
| 2012/0112789 A1* | 5/2012 | Yap | ..................... | H03K 19/0008 |
| | | | | 326/39 |
| 2016/0102249 A1* | 4/2016 | Nakajima | ............ | C09K 11/676 |
| | | | | 252/301.4 F |
| 2021/0102116 A1* | 4/2021 | Kudo | ................ | C04B 35/62807 |

FOREIGN PATENT DOCUMENTS

| | | |
|---|---|---|
| CN | 105308152 A | 2/2016 |
| JP | 2014-234455 A | 12/2014 |
| JP | 2016-117618 A | 6/2016 |
| JP | 2019-515030 A | 6/2019 |
| NO | 2019/026809 A1 | 2/2019 |
| WO | 2017/189344 A1 | 11/2017 |
| WO | WO 2019-026809 * | 2/2019 |
| WO | WO-2019026809 A1 * | 2/2019 |

OTHER PUBLICATIONS

The extended European search report issued by the European Patent Office on Sep. 4, 2023, which corresponds to European Patent Application No. 21747019.4-1108 and is related to U.S. Appl. No. 17/767,376.
International Search Report issued in PCT/JP2021/000656; mailed Mar. 23, 2021.
An Office Action; "Notice of Reasons for Refusal," mailed by the Japanese Patent Office on Sep. 27, 2022, which corresponds to Japanese Patent Application No. 2021-574594 and is related to U.S. Appl. No. 17/767,376; with English language translation.
An Office Action mailed by China National Intellectual Property Administration on Mar. 11, 2023, which corresponds to Chinese Patent Application No. 202180005854.7 and is related to U.S. Appl. No. 17/767,376; with English language translation.
Notification of Transmittal of Translation of the International Preliminary Report on Patentability and Translation of Written Opinion of the International Searching Authority; PCT/JP2021/000656; mailed on Aug. 11, 2022.
An Office Action mailed by China National Intellectual Property Administration on Aug. 1, 2023, which corresponds to Chinese Patent Application No. 202180005854.7 and is related to U.S. Appl. No. 17/767,376; with English language translation.

* cited by examiner

*Primary Examiner* — C Melissa Koslow
(74) *Attorney, Agent, or Firm* — Studebaker Brackett PLLC (57) ABSTRACT

Provided is a stabilized zirconia sintered body which comprises a fluorescent agent containing zirconium and titanium, and shows fluorescence when irradiated with light including light of a wavelength of 250 nm to 380 nm.

18 Claims, 3 Drawing Sheets

STABILIZED ZIRCONIA SINTERED BODY AND ZIRCONIA POWDER

TECHNICAL FIELD

The present invention relates to a stabilized zirconia sintered body and a zirconia powder.

BACKGROUND ART

Conventionally, zirconia sintered bodies that exhibit fluorescence (for example, Patent Documents 1 to 3) have been used in various technical fields.

Patent Document 1 discloses a partially stabilized zirconia sintered body containing a fluorescent agent such as $Y_2SiO_5$:Ce, $Y_2SiO_5$:Tb, (Y, Gd, Eu)$BO_3$, $Y_2O_3$:Eu, YAG:Ce, $ZnGa_2O_4$:Zn, or $BaMgAl_{10}O_{17}$:Eu.

Patent Document 2 discloses a zirconia sintered body containing an oxide, a hydroxide, an acetate, or a nitrate of a metal element such as Ga, Bi, Ce, Nd, Sm, Eu, Gd, Tb, Dy, or Tm as a fluorescent agent, and a zirconia sintered body containing $Y_2SiO_5$:Ce, $Y_2SiO_5$:Tb, (Y, Gd, Eu)$BO_3$, $Y_2O_3$:Eu, YAG:Ce, $ZnGa_2O_4$:Zn, or $BaMgAl_{10}O_{17}$:Eu as a fluorescent agent.

Patent Literature 3 discloses a dental article produced by sintering a dental mill blank containing a ceramic component selected from oxides of Zr, Hf, and Al and mixtures thereof, a stabilizing component selected from among oxides of Y, Mg, Ca, and Ce and mixtures thereof, a coloring component selected from among oxides of Fe, Mn, Cr, Ni, Er, Pr, Nd, and Tb and mixtures thereof, and a fluorescent component selected from among oxides of Bi and mixtures thereof.

PRIOR ART DOCUMENT

Patent Documents

Patent Document 1: JP-A-2016-117618
Patent Document 2: WO 2019/026809
Patent Document 3: JP-A-2019-515030

SUMMARY OF THE INVENTION

Problems to be Solved by the Invention

On the other hand, conventionally, no stabilized zirconia sintered body that contains titanium and exhibits fluorescence is known.

An object of the present invention is to provide a stabilized zirconia sintered body that contains titanium and exhibits fluorescence. Another object of the present invention is to provide a zirconia powder capable of affording a stabilized zirconia sintered body that contains titanium and exhibits fluorescence.

Means for Solving the Problems

The present inventors intensively studied zirconia sintered bodies. As a result, the present inventors surprisingly found that when a fluorescent agent comprising zirconium and titanium is used, a stabilized zirconia sintered body that contains titanium and exhibits fluorescence can be obtained, and have accomplished the present invention.

That is, the stabilized zirconia sintered body according to the present invention comprises a fluorescent agent containing zirconium and titanium, wherein the stabilized zirconia sintered body exhibits fluorescence in response to an irradiation with light including light having a wavelength of 250 nm or more and 380 nm or less.

Conventionally, there is a problem that when a zirconium stabilizer (for example, $Y_2O_3$) is added to a fluorescent agent comprising zirconium and titanium, fluorescence is quenched, and no sintered body that contains titanium and has fluorescence characteristics can be obtained.

Meanwhile, the stabilized zirconia sintered body according to the present invention comprises a fluorescent agent containing zirconium and titanium. According to the above configuration, since the fluorescent agent contains the same atom (zirconium) as zirconium constituting the stabilized zirconia sintered body, the fluorescent agent well blends with the stabilized zirconia sintered body, so that the fluorescent agent can significantly reduce the occurrence of cracking, etc. during a sintering process for obtaining the sintered body. As a result, it has become possible to obtain a stabilized zirconia sintered body that contains titanium and exhibits fluorescence.

Further, according to the above configuration, the stabilized zirconia sintered body comprises a fluorescent agent comprising zirconium and titanium, and exhibits fluorescence in response to an irradiation with light including light having a wavelength of 250 nm or more and 380 nm or less.

As described above, according to the present invention, it is possible to provide a stabilized zirconia sintered body that contains titanium and exhibits fluorescence. It is apparent from Examples that the present invention can provide a stabilized zirconia sintered body that contains titanium and exhibits fluorescence.

It is preferable in the above-described configuration that
 the stabilized zirconia sintered body contain stabilized zirconia, and
 a content of the fluorescent agent be 0.01 mass % or more and 5 mass % or less where an entire amount of the stabilized zirconia is 100 mass %.

When the content of the fluorescent agent is 0.01 mass % or more, good fluorescence is obtained. In addition, it is preferable to set the content of the fluorescent agent to 5 mass or less because a great improvement in fluorescence characteristics cannot be obtained even when the content of the fluorescent agent is more than 5% by mass %.

In addition, when the content of the fluorescent agent is 5 mass % or less, stabilized zirconia accounts for the most part, so that the stabilized zirconia sintered body is superior in such characteristics as mechanical strength.

It is preferable in the above configuration that the content of the fluorescent agent be 0.1 mass % or more and 2 mass %, or less where the entire amount of the stabilized zirconia is 100 mass %.

It is preferable in the above configuration that the stabilized zirconia sintered body emit light having an emission peak in a wavelength region of 400 nm or more and less than 600 nm in response to an irradiation with light including light having a wavelength of 250 nm or more and 380 nm or less.

When light having an emission peak in a wavelength region of 400 nm or more and less than 600 nm is emitted in response to an irradiation with light including light having a wavelength of 250 nm or more and 380 nm or less, it is easy, for example, to detect scratches and wear of the stabilized zirconia sintered body. In addition, the presence or absence of a specific wavelength (light having a wavelength of 250 nm or more and 380 nm or less) can be detected.

It is preferable in the above configuration that the fluorescent agent contain 90 mass % or more of zirconium oxide and 0.1 mass % or more and 5 mass % or less of titanium oxide where an entire amount of the fluorescent agent is 100 mass %.

The fluorescent agent containing 90 mass % or more of zirconium oxide and 0.1 mass % or more and 5 mass % or less of titanium oxide exhibits better fluorescence. Therefore, it is preferable to use a fluorescent agent having such a composition.

It is preferable in the above configuration that the fluorescent agent have a crystallite diameter of 40 nm or more and 65 nm or less.

When the crystallite diameter of the fluorescent agent is 40 nm or more and 65 nm or less, better fluorescence is obtained.

It is preferable in the above configuration that the stabilized zirconia sintered body has a relative sintered density of 99.5% or more.

When the relative sintered density is 99.5% or more, the stabilized zirconia sintered body has higher strength.

It is preferable in the above configuration that
the stabilized zirconia sintered body contain a stabilizer, and
the stabilizer is one or more compounds selected from the group consisting of $Y_2O_3$, $Sc_2O_3$, CaO, MgO, $Er_2O_3$, and $Yb_2O_3$.

It is preferable in the above configuration that
the stabilized zirconia sintered body contain stabilized zirconia,
the stabilizer is $Y_2O_3$, and
a content of $Y_2O_3$ based on the entire amount of the stabilized zirconia is 1.8 mol % or more and 7 mol % or less.

When the content of $Y_2O_3$ is 1.8 mol % or more and 7 mol % or less, the stabilized zirconia sintered body is more enhanced in mechanical strength.

In the above configuration, the stabilized zirconia sintered body may contain aluminum oxide. When the stabilized zirconia sintered body contains aluminum oxide, the content of the aluminum oxide is preferably 2 mol % or more and less than 50 mol % where the entire amount of the stabilized zirconia sintered body is 100 mol %.

When the stabilized zirconia sintered body contains aluminum oxide in a content within the above numerical range, such characteristics as strength can be improved by combination with aluminum oxide (alumina). That is, when the stabilized zirconia sintered body contains aluminum oxide in a content within the above numerical range, the stabilized zirconia sintered body can have both high strength due to the combination with aluminum oxide (alumina) and fluorescence characteristics.

It is preferable in the above configuration that the stabilized zirconia sintered body contain one or more elements selected from the group consisting of Fe, V, Er, Mn, Co, Cr, Si, Ti, Zn, and Nb.

When the stabilized zirconia sintered body contains one or more elements selected from the group consisting of Fe, V, Er, Mn, Co, Cr, Si, Ti, Zn, and Nb, the stabilized zirconia sintered body can be suitably colored.

Further, the zirconia powder according to the present invention comprises:
stabilized zirconia particles, and
a fluorescent agent containing zirconium and titanium, wherein
a content of the fluorescent agent is 0.01 mass % or more and 5 mass % or less where an entire amount of the stabilized zirconia particles is 100 mass %.

According to the above configuration, a stabilized zirconia sintered body that contains titanium and exhibits fluorescence can be obtained by sintering the zirconia powder.

It is preferable in the above configuration that the content of the fluorescent agent is 0.1 mass % or more and 2 mass % or less where the entire amount of the stabilized zirconia particles is 100 mass %.

It is preferable in the above configuration that the fluorescent agent contain 90 mass % or more of zirconium oxide and 0.1 mass % or more and 5 mass % or less of titanium oxide where an entire amount of the fluorescent agent is 100 mass %.

The fluorescent agent containing 90 mass % or more of zirconium oxide and 0.1 mass % or more and 5 mass % or less of titanium oxide exhibits better fluorescence. Therefore, it is preferable to use a fluorescent agent having such a composition.

It is preferable in the above configuration that the fluorescent agent have a crystallite diameter of 40 nm or more and 65 nm or less.

When the fluorescent agent has a crystallite diameter of 40 nm or more, the stabilizer constituting the stabilized zirconia particles is solid-dissolved into the fluorescent agent in sintering the zirconia powder, so that fluorescence can be prevented from failing to be obtained. As a result, better fluorescence is obtained. When the crystallite diameter of the fluorescent agent is 65 nm or less, the resulting stabilized zirconia sintered body can have higher strength. The crystallite diameter of the fluorescent agent can be controlled by varying a calcining temperature of the oxide in the production of the fluorescent agent.

It is preferable in the above configuration that the fluorescent agent have an average particle diameter of 1 μm or more and 20 μm or less.

When the fluorescent agent has an average particle diameter of 1 μm or more, the stabilizer constituting the stabilized zirconia particles is solid-dissolved into the fluorescent agent in sintering the zirconia powder, so that fluorescence can be prevented from failing to be obtained. As a result, better fluorescence is obtained. When the average particle diameter of the fluorescent agent is 20 μm or less, the stabilized zirconia sintered body obtained by sintering the zirconia powder can have higher strength. The average particle diameter of the fluorescent agent can be controlled by varying a grinding time in the production of the fluorescent agent.

It is preferable in the above configuration that
the stabilized zirconia sintered body contain a stabilizer, and
the stabilizer is one or more compounds selected from the group consisting of $Y_2O_3$, $Sc_2O_3$, CaO, MgO, $Er_2O_3$, and $Yb_2O_3$.

It is preferable in the above configuration that
the stabilizer be $Y_2O_3$, and
a content of $Y_2O_3$ based on the entire amount of the stabilized zirconia particles be 1.8 mol % or more and 7 mol % or less.

When the content of $Y_2O_3$ is 1.8 mol % or more and 7 mol % or less, the stabilized zirconia sintered body obtained by sintering the zirconia powder is more enhanced in mechanical strength.

In the above configuration, the stabilized zirconia sintered body may contain aluminum oxide. When the zirconia powder contains aluminum oxide, the content of the aluminum oxide is preferably 2 mol % or more and less than 50 mol % where the entire amount of the zirconia powder is 100 mol %.

When the zirconia powder contains aluminum oxide within the above numerical range, the stabilized zirconia sintered body obtained by sintering the zirconia powder can be improved in characteristics such as strength by combination with aluminum oxide (alumina). That is, when the zirconia powder contains aluminum oxide within the above numerical range, the stabilized zirconia sintered body obtained by sintering the zirconia powder can have both high strength due to the combination with aluminum oxide (alumina) and fluorescence characteristics.

It is preferable in the above configuration that the stabilized zirconia sintered body contain one or more elements selected from the group consisting of Fe, V, Er, Mn, Co, Cr, Si, Ti, Zn, and Nb.

When the stabilized zirconia sintered body contains one or more elements selected from the group consisting of Fe, V, Er, Mn, Co, Cr, Si, Ti, Zn, and Nb, the stabilized zirconia sintered body can be suitably colored.

Effect of the Invention

According to the present invention, it is possible to provide a stabilized zirconia sintered body that contains titanium and exhibits fluorescence. In addition, it is possible to provide a zirconia powder capable of affording a stabilized zirconia sintered body that contains titanium and exhibits fluorescence.

MODE FOR CARRYING OUT THE INVENTION

Hereinafter, embodiments of the present invention will be described. However, the present invention is not limited only to these embodiments. In the present specification, zirconia (zirconium oxide) is a common zirconia and contains 10 mass % or less of an impurity metal compound including hafnia.

[Stabilized Zirconia Sintered Body]

The stabilized zirconia sintered body according to the present embodiment comprises a fluorescent agent comprising zirconium and titanium, and exhibits fluorescence in response to an irradiation with light including light having a wavelength of 250 nm or more and 380 nm or less.

(Fluorescence Characteristics)

The stabilized zirconia sintered body exhibits fluorescence in response to an irradiation with light including light having a wavelength of 250 nm or more and 380 nm or less. The stabilized zirconia sintered body preferably exhibits fluorescence in response to an irradiation with light including light having a wavelength of 350 nm or less, more preferably exhibits fluorescence in response to an irradiation with light including light having a wavelength of 320 nm or less, and still more preferably exhibits fluorescence in response to an irradiation with light including light having a wavelength of 300 nm or less. In particular, from the viewpoint of making fluorescence to be emitted by applying invisible light, the stabilized zirconia sintered body preferably exhibits fluorescence in response to an irradiation with light including light having a wavelength of 350 nm or less. In addition, from the viewpoint of fluorescence characteristics of the fluorescent agent, the stabilized zirconia sintered body preferably exhibits fluorescence in response to an irradiation with light including light having a wavelength of 270 nm or more and 330 nm or less.

When the stabilized zirconia sintered body does not contain a coloring element described below, the stabilized zirconia sintered body is usually white.

The stabilized zirconia sintered body preferably emits light having an emission peak (wavelength having the highest fluorescence intensity) in a wavelength region of 400 nm or more and less than 600 nm, more preferably in a wavelength region of 430 nm or more and less than 550 nm, and still more preferably in a wavelength region of 450 nm or more and less than 500 nm in response to an irradiation with light including light having a wavelength of 250 nm or more and 380 nm or less.

When light having an emission peak in a wavelength region of 400 nm or more and less than 600 nm is emitted in response to an irradiation with light including light having a wavelength of 250 nm or more and 380 nm or less, it is easy, for example, to detect scratches and wear of the stabilized zirconia sintered body. In addition, the presence or absence of a specific wavelength (light having a wavelength of 250 nm or more and 380 nm or less) can be detected.

(Fluorescent Agent)

Figure 1:
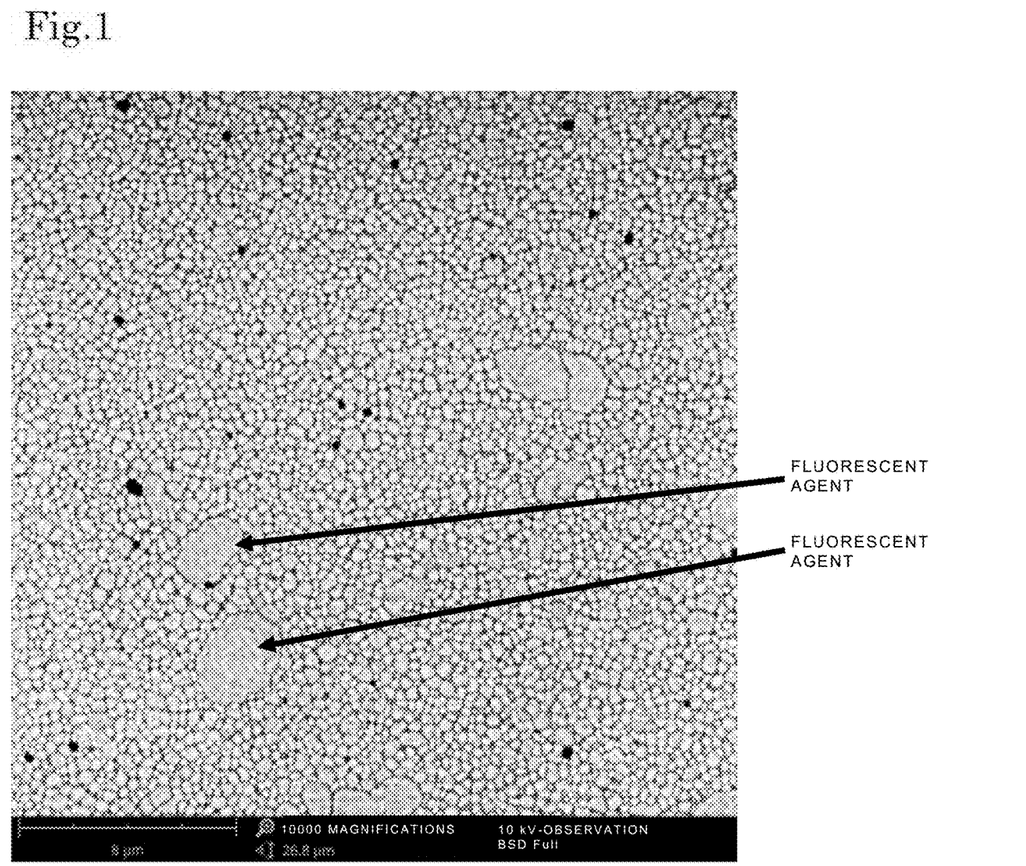
FIG. 1 is a SEM image showing one example of a stabilized zirconia sintered body according to the present embodiment.

The stabilized zirconia sintered body according to the present embodiment comprises a fluorescent agent comprising zirconium and titanium. The stabilized zirconia sintered body preferably comprises stabilized zirconia. FIG. 1 is a SEM image showing one example of the stabilized zirconia sintered body. In FIG. 1, the fluorescent agent has a large particle diameter. As shown in FIG. 1, the fluorescent agent is preferably interspersed in the stabilized zirconia sintered body. More specifically, the fluorescent agent is preferably interspersed such that the fluorescent agent is in contact with stabilized zirconia (interlinked stabilized zirconia particles) constituting the stabilized zirconia sintered body. In the present invention, the fluorescent agent is just required to be contained in the stabilized zirconia sintered body, and the form in which the fluorescent agent is contained is not particularly limited.

FIG. 1 illustrates the stabilized zirconia sintered body after thermal etching in order to obtain a SEM image. Accordingly, it appears that the stabilized zirconia particles are not connected to each other because grain boundaries are melted. In practice, however, when a polished surface of the obtained stabilized zirconia sintered body is observed, interfaces between the stabilized zirconia particles are not visible and the stabilized zirconia particles are connected by sintering.

Figure 2:
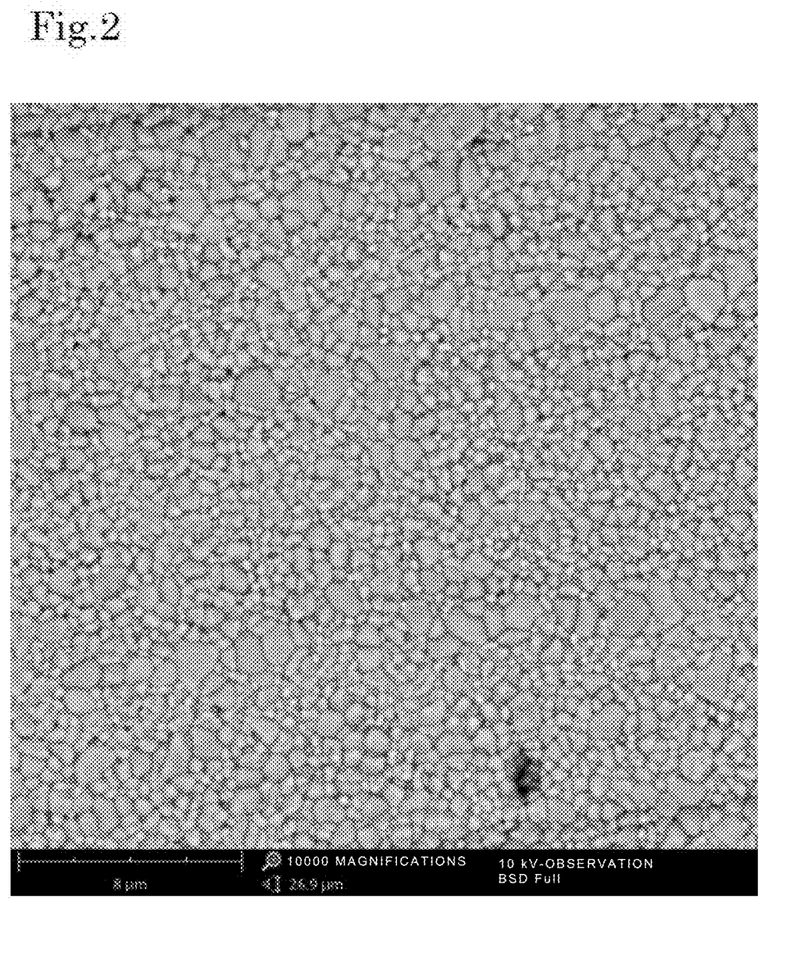
FIG. 2 is a SEM image of the stabilized zirconia sintered body according to Example 1.

FIG. 1 is a SEM image of a stabilized zirconia sintered body prepared for the purpose of making it possible to distinguish a fluorescent agent and stabilized zirconia on an image. That is, when the particle diameter of the fluorescent agent is substantially equal to that of the stabilized zirconia, these materials cannot be distinguished from each other on a SEM image. The stabilized zirconia sintered body in FIG. 1 was prepared in order to confirm the state of the fluorescent agent in the stabilized zirconia sintered body. Therefore, the particle diameter of the fluorescent agent is not limited to the particle diameter shown in FIG. 1. For reference, FIG. 2 shows a SEM image of the stabilized zirconia sintered body according to Example 1. Although not clear from FIG. 2, it can be understood from comparison with FIG. 1 that in the stabilized zirconia sintered body of Example 1, the fluorescent agent is interspersed in the stabilized zirconia sintered body.

The fluorescent agent preferably exhibits fluorescence in response to an irradiation with light including light having a wavelength of 380 nm or less, more preferably exhibits fluorescence in response to an irradiation with light including light having a wavelength of 350 nm or less, still more preferably exhibits fluorescence in response to an irradiation with light including light having a wavelength of 320 nm or less, and particularly preferably exhibits fluorescence in response to an irradiation with light including light having a wavelength of 300 nm or less. The fluorescent agent preferably exhibits fluorescence in response to an irradiation with light including light having a wavelength of 250 nm or more, and more preferably exhibits fluorescence in response to an irradiation with light including light having a wavelength of 270 nm. In particular, from the viewpoint of making fluorescence to be emitted by applying invisible light, the stabilized zirconia sintered body preferably exhibits fluorescence in response to an irradiation with light including light having a wavelength of 350 nm or less. In addition, from the viewpoint of fluorescence characteristics of the fluorescent agent, the stabilized zirconia sintered body preferably exhibits fluorescence in response to an irradiation with light including light having a wavelength of 270 nm or more and 330 nm or less.

The fluorescent agent preferably contains 90 mass % or more of zirconium oxide (zirconia) and 0.1 mass % or more and 5 mass % or less of titanium oxide where the entire amount of the fluorescent agent is 100 mass %.

The content of the zirconium oxide contained in the fluorescent agent is more preferably 90 mass % or more, still more preferably 95 mass % or more, particularly preferably 98 mass % or more, and especially preferably 99.5 mass %, or more where the entire amount of the fluorescent agent is 100 mass %.

The content of the titanium oxide contained in the fluorescent agent is more preferably 0.1 mass %, or more, still more preferably 0.15 mass % or more, particularly preferably 0.2 mass % or more, and especially preferably 0.23 mass % or more where the entire amount of the fluorescent agent is 100 mass %.

The content of the titanium oxide contained in the fluorescent agent is more preferably 5% by mass or less, still more preferably 2% by mass or less, particularly preferably 1% by mass or less, and especially preferably 0.5% by mass or less where the entire amount of the fluorescent agent is 100 mass %.

The fluorescent agent containing 90 mass % or more of zirconium oxide and 0.1 mass % or more and 5 mass % or less of titanium oxide exhibits better fluorescence. Therefore, it is preferable to use a fluorescent agent having such a composition. In particular, when the content of the titanium oxide is within the above range, anion lattice defects (F centers) in a crystal are sufficiently formed and the influence of concentration quenching is small. Therefore, the fluorescent agent has a more enhanced fluorescence intensity.

The fluorescent agent may contain an element other than zirconium (for example, zirconium oxide) and titanium (for example, titanium oxide). Examples of the other element include phosphorus, selenium, boron, and silicon. It is preferable that the content of the other element be not so much as to significantly affect the fluorescence characteristics of the fluorescent agent.

The crystallite diameter of the fluorescent agent is preferably 40 nm or more and 65 nm or less. The crystallite diameter is more preferably 43 nm or more, still more preferably 45 nm or more, particularly preferably 47 nm or more, and especially preferably 50 nm or more. The crystallite diameter is more preferably 62 nm or less, still more preferably 60 nm or less, particularly preferably 57 nm or less, and especially preferably 55 nm or less.

When the crystallite diameter of the fluorescent agent is 40 nm or more and 65 nm or less, better fluorescence is obtained.

The crystallite diameter is calculated by applying a measurement result of a peak appearing at 2θ of 27° to 29° in XRD measurement to the following Scherrer formula.

$$Dp = (K \times \lambda)/\beta \cos \theta$$

Here, Dp is the crystallite diameter of the fluorescent agent; λ is the wavelength of X-rays; θ is a diffraction angle; K is a constant referred to as a shape factor; and β is a peak width after the spreading of a diffraction line according to an apparatus is corrected.

The peak at which 2θ is 27° to 29° is a peak derived from the monoclinic phase of zirconium oxide.

The fluorescent agent preferably has an average particle diameter of 1 μm or more and 20 μm or less. The average particle diameter is more preferably 3 μm or more, still more preferably 5 μm or more, particularly preferably 7 μm or more, and especially preferably 10 μm or more. The average particle diameter is more preferably 17 μm or less, still more preferably 15 μm or less, particularly preferably 12 μm or less, and especially preferably 10 μm or less.

When the average particle diameter of the fluorescent agent is 1 μm or more, better fluorescence is obtained. When the average particle diameter of the fluorescent agent is 20 μm or less, the stabilized zirconia sintered body can have higher strength.

The content of the fluorescent agent is preferably 0.01 mass % or more and 5 mass % or less where the entire amount of the stabilized zirconia is 100 mass %. The content of the fluorescent agent is more preferably 0.1 mass % or more, still more preferably 0.2 mass % or more, particularly preferably 0.25 mass % or more, and especially preferably 0.3 mass % or more where the entire amount of the stabilized zirconia is 100 mass %. The content of the fluorescent agent is more preferably 2 mass % or less, still more preferably 1.5 mass % or less, particularly preferably 1.3 mass % or less, and especially preferably 1 mass % or less where the entire amount of the stabilized zirconia is 100 mass %.

When the content of the fluorescent agent is 0.01 mass % or more, good fluorescence is obtained. In addition, it is preferable to set the content of the fluorescent agent to 5 mass % or less because a great improvement in fluorescence characteristics cannot be obtained even when the content of the fluorescent agent is more than 5% by mass %.

(Stabilized Zirconia)

As described above, the stabilized zirconia sintered body preferably comprises stabilized zirconia. Stabilized zirconia refers to zirconia to which a stabilizer is added, and the stabilizer is solid-dissolved in zirconia. Stabilized zirconia has a cubic crystal phase, a tetragonal crystal phase, or a mixed crystal of a cubic crystal and a tetragonal crystal phase at room temperature (25° C.), and phase transition due to temperature rise and temperature drop is suppressed. Meanwhile, zirconia with no stabilizer added is monoclinic at room temperature, and when the temperature is increased, the crystal structure undergoes phase transition to tetragonal crystal and to cubic crystal. Zirconia with no stabilizer added changes in volume with phase transition, and therefore a sintered body cannot be obtained therefrom.

The stabilized zirconia in the present embodiment may be completely stabilized zirconia or partially stabilized zirconia. The completely stabilized zirconia refers to stabilized zirconia in which the transformation of a crystal phase is completely suppressed. The partially stabilized zirconia refers to stabilized zirconia in which the transformation of a crystal phase is partially allowed by, for example, decreasing the amount of the stabilizer added. The stabilized zirconia in the present embodiment is preferably partially stabilized zirconia from the viewpoint of higher strength.

The stabilizer is preferably one or more compounds selected from the group consisting of $Y_2O_3$, $Sc_2O_3$, CaO, MgO, $Er_2O_3$, and $Yb_2O_3$.

Incidentally, when a compound containing Ce (cerium) is used as the stabilizer, the compound absorbs fluorescence (especially, absorbs blue fluorescence) as a result of coloring in yellow or the like. Therefore, it is preferable that a compound containing Ce be not contained as the stabilizer.

Especially, the stabilizer is preferably $Y_2O_3$, and the content of $Y_2O_3$ based on the entire amount of the stabilized zirconia is preferably 1.8 mol % or more and 7 mol % or less. When the content of $Y_2O_3$ is 1.8 mol % or more and 7 mol % or less, partially stabilized zirconia is obtained. When the content of $Y_2O_3$ is 1.8 mol % or more and 7 mol % or less, the stabilized zirconia sintered body is more enhanced in mechanical strength.

The stabilized zirconia sintered body may contain aluminum oxide as a sintering aid and/or as a structural material. When the content of the aluminum oxide is relatively small, the aluminum oxide mainly functions as a sintering aid, whereas when the content of the aluminum oxide is relatively large, the aluminum oxide mainly functions as a structural material. When the content of the aluminum oxide is between these contents, the aluminum oxide mainly functions as a sintering aid and also as a structural material.

When the stabilized zirconia sintered body contains aluminum oxide as a structural material, the content of the aluminum oxide is preferably 2 mol % or more and less than 50 mol % where the entire amount of the stabilized zirconia sintered body is 100 mol %.

When the stabilized zirconia sintered body contains aluminum oxide in a content within the above numerical range, such characteristics as strength can be improved by combination with aluminum oxide (alumina). That is, when the stabilized zirconia sintered body contains aluminum oxide in a content within the above numerical range, the stabilized zirconia sintered body can have both high strength due to the combination with aluminum oxide (alumina) and fluorescence characteristics.

When the stabilized zirconia sintered body contains aluminum oxide as a structural material, the content of the aluminum oxide is preferably 3 mol % or more, more preferably 5 mol % or more, still more preferably 10 mol % or more, particularly preferably 15 mol % or more, especially preferably 20 mol % or more, and extremely preferably 22 mol % or more where the entire amount of the stabilized zirconia sintered body is 100 mol %.

When the stabilized zirconia sintered body contains aluminum oxide as a structural material, the content of the aluminum oxide is preferably 40 mol % or less, more preferably 35 mol % or more, still more preferably 30 mol % or less, particularly preferably 27 mol % or less, especially preferably 25 mol % or less, and extremely preferably 24 mol % or less where the entire amount of the stabilized zirconia sintered body is 100 mol %.

When the stabilized zirconia sintered body contains aluminum oxide as a sintering aid, the content of the aluminum oxide is preferably 0.01 mol % or more and 0.4 mol % or less where the entire amount of the stabilized zirconia sintered body is 100 mol %.

When the stabilized zirconia sintered body contains aluminum oxide within the above numerical range, the sinterability of the stabilized zirconia sintered body is improved, and the crystal structure is likely to be homogenized.

When the stabilized zirconia sintered body contains aluminum oxide as a sintering aid, the content of the aluminum oxide is preferably 0.01 mol % or more, more preferably 0.03 mol % or more, still more preferably 0.05 mol % or more, particularly preferably 0.07 mol % or more, especially preferably 0.1 mol % or more, and extremely preferably 0.11 mol % or where the entire amount of the stabilized zirconia sintered body is 100 mol %.

When the stabilized zirconia sintered body contains aluminum oxide as a sintering aid, the content of the aluminum oxide is preferably 0.35 mol % or less, more preferably 0.3 mol % or less, still more preferably 0.25 mol % or less, particularly preferably 0.20 mol % or less, especially preferably 0.17 mol % or less, and extremely preferably 0.15 mol % or less where the entire amount of the stabilized zirconia sintered body is 100 mol %.

When the aluminum oxide is made to function as a sintering aid and also as a structural material, the content of the aluminum oxide is preferably 0.45 mol % or more, more preferably 0.5 mol % or more, still more preferably 0.6 mol % or more, particularly preferably 0.7 mol % or more, especially preferably 0.8 mol % or more, and extremely preferably 0.9 mol % or more where the entire amount of the stabilized zirconia sintered body is 100 mol %.

When the aluminum oxide is caused to function as a sintering aid and also as a structural material, the content of the aluminum oxide is preferably 1.9 mol % or less, more preferably 1.7 mol % or less, still more preferably 1.5 mol % or less, particularly preferably 1.4 mol % or less, especially preferably 1.2 mol % or less, and extremely preferably 1.1 mol % or less where the entire amount of the stabilized zirconia sintered body is 100 mol %.

In addition to or instead of aluminum oxide, the stabilized zirconia sintered body may contain sinterable ceramics, a thermosetting resin, or the like for the purpose of improving characteristics such as strength.

(Coloring Element)

The stabilized zirconia sintered body may contain one or more elements selected from the group consisting of Fe, V, Er, Mn, Co, Cr, Si, Ti, Zn, and Nb. When the zirconia sintered body contains one or more elements selected from the group consisting of Fe, V, Er, Mn, Co, Cr, Si, Ti, Zn, and Nb as a coloring element, the zirconia sintered body can be suitably colored.

The form of the coloring element is not particularly limited, and the coloring element can be added in the form of an oxide, a chloride, or the like. Specific examples of a colorant containing the coloring element include $Fe_2O_3$, $V_2O_5$, $Er_2O_3$, $MnO_2$, $Co_3O_4$, $Cr_2O_3$, $SiO_2$, $TiO_2$, ZnO, and $Nb_2O_5$.

When $Fe_2O_3$ is contained as the colorant, the content of the colorant is preferably 0.001 mol % or more and 0.01 mol % or less, and more preferably 0.0015 mol % or more and 0.005 mol % or less where the entire amount of the stabilized zirconia sintered body is 100 mol %. When the content of the colorant is 0.001 mol % or more, intended coloring is easily obtained. That is, the color tone can be easily adjusted. When the content of the colorant is 0.01 mol % or less, inhibition of fluorescence can be suppressed.

When $V_2O_5$ is contained as the colorant, the content of the colorant is preferably 0.001 mol % or more and 0.03 mol % or less, and more preferably 0.0015 mol % or more and 0.02 mol % or less where the entire amount of the stabilized zirconia sintered body is 100 mol %. When the content of the colorant is 0.001 mol % or more, intended coloring is easily obtained. That is, the color tone can be easily adjusted. When the content of the colorant is 0.03 mol % or less, inhibition of fluorescence can be suppressed.

When $Er_2O_3$ is contained as the colorant, the content of the colorant is preferably 0.1 mol % or more and 8 mol % or less, more preferably 0.5 mol % or more and 6 mol % or less, still more preferably 1 mol % or more and 5 mol % or less, and particularly preferably 2 mol % or more and 4 mol % or less where the entire amount of the stabilized zirconia sintered body is 100 mol %. When the content of the colorant is 0.1 mol % or more, intended coloring is easily obtained. That is, the color tone can be easily adjusted. When the content of the colorant is 8 mol % or less, decrease in strength (for example, decrease in three-point bending strength, and the like) can be suppressed. $Er_2O_3$ also has an effect as a stabilizer, but does not exhibit fluorescence.

When $MnO_2$ is contained as the colorant, the content of the colorant is preferably 0.001 mol % or more and 0.05 mol % or less, and more preferably 0.003 mol % or more and 0.02 mol % or less where the entire amount of the stabilized zirconia sintered body is 100 mol %. When the content of the colorant is 0.001 mol % or more, intended coloring is easily obtained. That is, the color tone can be easily adjusted. When the content of the colorant is 0.05 mol % or less, inhibition of fluorescence can be suppressed.

When $Cr_2O_3$ is contained as the colorant, the content of the colorant is preferably 0.001 mol % or more and 0.04 mol % or less, and more preferably 0.003 mol % or more and 0.02 mol % or less where the entire amount of the stabilized zirconia sintered body is 100 mol %. When the content of the colorant is 0.001 mol % or more, intended coloring is easily obtained. That is, the color tone can be easily adjusted. When the content of the colorant is 0.04 mol % or less, inhibition of fluorescence can be suppressed.

When $Co_3O_4$ is contained as the colorant, the content of the colorant is preferably 0.001 mol % or more and 0.03 mol % or less, and more preferably 0.003 mol % or more and 0.015 mol % or less where the entire amount of the stabilized zirconia sintered body is 100 mol %. When the content of the colorant is 0.001 mol % or more, intended coloring is easily obtained. That is, the color tone can be easily adjusted. When the content of the colorant is 0.03 mol % or less, inhibition of fluorescence can be suppressed.

When $SiO_2$ is contained as the colorant, the content of the colorant is preferably 0.02 mol % or more and 1.5 mol % or less, more preferably 0.05 mol % or more and 1.0 mol % or less, and still more preferably 0.07 mol % or more and 0.7 mol % or less where the entire amount of the stabilized zirconia sintered body is 100 mol %. When the content of the colorant is 0.02 mol % or more, intended coloring is easily obtained. That is, the color tone can be easily adjusted. When the content of the colorant is 1.5 mol % or less, inhibition of fluorescence can be suppressed.

When $TiO_2$ is contained as the colorant, the content of the colorant is preferably 0.02 mol % or more and 1.5 mol % or less, more preferably 0.05 mol % or more and 1.0 mol % or less, and still more preferably 0.07 mol % or more and 0.7 mol % or less where the entire amount of the stabilized zirconia sintered body is 100 mol %. When the content of the colorant is 0.02 mol % or more, intended coloring is easily obtained. That is, the color tone can be easily adjusted. When the content of the colorant is 1.5 mol % or less, inhibition of fluorescence can be suppressed.

When ZnO is contained as the colorant, the content of the colorant is preferably 0.02 mol % or more and 1.5 mole or less, more preferably 0.1 mol % or more and 1.2 mol % or less, and still more preferably 0.15 mol % or more and 1.0 mol % or less, where the entire amount of the stabilized zirconia sintered body is 100 mol %. When the content of the colorant is 0.02 mol % or more, intended coloring is easily obtained. That is, the color tone can be easily adjusted. When the content of the colorant is 1.5 mol % or less, inhibition of fluorescence can be suppressed.

When $Nb_2O_5$ is contained as the colorant, the content of the colorant is preferably 0.01 mol % or more and 1.0 mol % or less, more preferably 0.02 mol % or more and 0.7 mol % or less, and still more preferably 0.04 mol % or more and 0.5 mol % or less where the entire amount of the stabilized zirconia sintered body is 100 mol %. When the content of the colorant is 0.01 mol % or more, intended coloring is easily obtained. That is, the color tone can be easily adjusted. When the content of the colorant is 1.0 mol % or less, inhibition of fluorescence can be suppressed.

As the fluorescent agent, specifically, those disclosed in Japanese Patent No. 6184174 (JP-A-2014-234455) can be used. The fluorescent agent can be produced by the method disclosed in Japanese Patent No. 6184174 (JP-A-2014-234455).

(Relative Sintered Density)

The relative sintered density of the stabilized zirconia sintered body is preferably 99.5% or more, more preferably 99.7% or more, still more preferably 99.8% or more, particularly preferably 99.82% or more, and especially preferably 99.85% or more. When the relative sintered density is 99.5% or more, the stabilized zirconia sintered body has higher strength.

(Three-Point Bending Strength)

The three-point bending strength of the stabilized zirconia sintered body is preferably 300 MPa or more, more preferably 400 MPa or more, still more preferably 500 MPa or more, and particularly preferably 600 MPa or more. The three-point bending strength is preferably as high as possible, and for example, the three-point bending strength may be 1800 MPa or less, 1500 MPa or less, or 1300 MPa or less or the like.

The three-point bending strength of the stabilized zirconia sintered body refers to a value obtained by the method described in Examples.

As described above, according to the stabilized zirconia sintered body of the present embodiment, since the fluorescent agent contains the same atom (zirconium) as zirconium constituting the stabilized zirconia sintered body, the fluorescent agent well blends with the stabilized zirconia sintered body, so that the fluorescent agent can significantly reduce the occurrence of cracking, etc. during a sintering process for obtaining the sintered body. As a result, it has become possible to obtain a stabilized zirconia sintered body that contains titanium and exhibits fluorescence.

In addition, the stabilized zirconia sintered body according to the present embodiment comprises a fluorescent agent comprising zirconium and titanium, and exhibits fluorescence in response to an irradiation with light including light having a wavelength of 250 nm or more and 380 nm or less.

As described above, according to the stabilized zirconia sintered body according to the present embodiment, it is possible to provide a stabilized zirconia sintered body that contains titanium and exhibits fluorescence.

The stabilized zirconia sintered body according to the present embodiment can be used as an industrial part, an aesthetic part, or a dental material. More specifically, the stabilized zirconia sintered body can be used for jewelry, watch parts, watch faces, artificial teeth, members for molding processing, wear resistant members, chemical resistant members, etc.

The method for producing the stabilized zirconia sintered body according to the present embodiment is not particularly limited, and the stabilized zirconia sintered body can be obtained by sintering a zirconia powder comprising stabilized zirconia particles and a fluorescent agent. Accordingly, the zirconia powder will be described below.

[Zirconia Powder]

The zirconia powder according to the present embodiment comprises:
  stabilized zirconia particles, and
  a fluorescent agent comprising zirconium and titanium, wherein
  the content of the fluorescent agent is 0.01 mass % or more and 5 mass % or less where the entire amount of the stabilized zirconia particles is 100 mass %.

The zirconia powder can be provided as a mixture containing the stabilized zirconia particles and the fluorescent agent though is not particularly limited thereto.

(Fluorescent Agent)

As described above, the fluorescent agent comprises zirconium and titanium. The fluorescent agent preferably exhibits fluorescence in response to an irradiation with light including light having a wavelength of 380 nm or less, more preferably exhibits fluorescence in response to an irradiation with light including light having a wavelength of 350 nm or less, still more preferably exhibits fluorescence in response to an irradiation with light including light having a wavelength of 320 nm or less, and particularly preferably exhibits fluorescence in response to an irradiation with light including light having a wavelength of 300 nm or less. The fluorescent agent preferably exhibits fluorescence in response to an irradiation with light including light having a wavelength of 250 nm or more, and more preferably exhibits fluorescence in response to an irradiation with light including light having a wavelength of 270 nm. In particular, from the viewpoint of making a stabilized zirconia sintered body obtained by sintering the zirconia powder exhibit fluorescence by irradiating the stabilized zirconia sintered body with invisible light, the fluorescent agent preferably exhibits fluorescence in response to an irradiation with light including light having a wavelength of 350 nm or less. In addition, from the viewpoint of fluorescence characteristics of the fluorescent agent, the stabilized zirconia sintered body preferably exhibits fluorescence in response to an irradiation with light including light having a wavelength of 270 nm or more and 330 nm or less.

The fluorescent agent preferably contains 90 mass % or more of zirconium oxide and 0.1 mass % or more and 5 mass % or less of titanium oxide where the entire amount of the fluorescent agent is 100 mass %.

The content of the zirconium oxide contained in the fluorescent agent is more preferably 90 mass % or more, still more preferably 95 mass % or more, particularly preferably 98 mass % or more, and especially preferably 99.5 mass % or more where the entire amount of the fluorescent agent is 100 mass %.

The content of the titanium oxide contained in the fluorescent agent is more preferably 0.1 mass % or more, still more preferably 0.15 mass % or more, particularly preferably 0.2 mass % or more, and especially preferably 0.23 mass % or more where the entire amount of the fluorescent agent is 100 mass %.

The content of the titanium oxide contained in the fluorescent agent is more preferably 5% by mass or less, still more preferably 2% by mass or less, particularly preferably 1% by mass or less, and especially preferably 0.5% by mass or less where the entire amount of the fluorescent agent is 100 mass %.

The fluorescent agent containing 90 mass % or more of zirconium oxide and 0.1 mass % or more and 5 mass % or less of titanium oxide exhibits better fluorescence. Therefore, it is preferable to use a fluorescent agent having such a composition. In particular, when the content of the titanium oxide is within the above range, anion lattice defects (F centers) in a crystal are sufficiently formed and the influence of concentration quenching is small. Therefore, the fluorescent agent has a more enhanced fluorescence intensity.

The fluorescent agent may contain an element other than zirconium (for example, zirconium oxide) and titanium (for example, titanium oxide). Examples of the other element include phosphorus, selenium, boron, and silicon. It is preferable that the content of the other element be not so much as to significantly affect the fluorescence characteristics of the fluorescent agent.

The crystallite diameter of the fluorescent agent is preferably 40 nm or more and 65 nm or less. The crystallite diameter is more preferably 43 nm or more, still more preferably 45 nm or more, particularly preferably 47 nm or more, and especially preferably 50 nm or more. The crystallite diameter is more preferably 62 nm or less, still more preferably 60 nm or less, particularly preferably 57 nm or less, and especially preferably 55 nm or less.

When the crystallite diameter of the fluorescent agent is 40 nm or more and 65 nm or less, better fluorescence is obtained.

The crystallite diameter is calculated by applying a measurement result of a peak appearing at 2θ of 27° to 29° in XRD measurement to the following Scherrer formula.

$$Dp=(K{\times}\lambda)/\beta \cos \theta$$

Here, Dp is the crystallite diameter of the fluorescent agent; λ is the wavelength of X-rays; θ is a diffraction angle; K is a constant referred to as a shape factor; and β is a peak width after the spreading of a diffraction line according to an apparatus is corrected.

The peak at which 2θ is 27° to 29° is a peak derived from the monoclinic phase of zirconium oxide.

XRD measurement conditions are as described in detail in Examples.

The fluorescent agent preferably has an average particle diameter of 1 μm or more and 20 μm or less. The average particle diameter is more preferably 3 μm or more, still more preferably 5 μm or more, particularly preferably 7 μm or more, and especially preferably 10 μm or more. The average particle diameter is more preferably 17 μm or less, still more preferably 15 μm or less, particularly preferably 12 μm or less, and especially preferably 10 μm or less.

When the average particle diameter of the fluorescent agent is 1 μm or more, better fluorescence is obtained. When the average particle diameter of the fluorescent agent is 20 μm or less, a stabilized zirconia sintered body obtained by sintering the zirconia powder can have higher strength.

The average particle diameter of the fluorescent agent is a value measured using a laser diffraction type particle size distribution measuring device "SALD-2300" (manufactured by Shimadzu Corporation). More specifically, the average particle diameter is measured based on a method described in Examples. The average particle diameter described in the present description is a value measured on a volume basis.

The content of the fluorescent agent is preferably 0.01 mass % or more and 5 mass % or less where the entire amount of the stabilized zirconia particles is 100 mass %. The content of the fluorescent agent is more preferably 0.1 mass % or more, still more preferably 0.2 mass % or more, particularly preferably 0.25 mass % or more, and especially preferably 0.3 mass % or more where the entire amount of the stabilized zirconia particles is 100 mass %. The content of the fluorescent agent is more preferably 2 mass % or less, still more preferably 1.5 mass % or less, particularly preferably 1.3 mass % or less, and especially preferably 1 mass % or less where the entire amount of the stabilized zirconia particles is 100 mass %.

When the content of the fluorescent agent is 0.01 mass % or more, good fluorescence is obtained. In addition, it is preferable to set the content of the fluorescent agent to 5 mass % or less because a great improvement in fluorescence characteristics cannot be obtained even when the content of the fluorescent agent is more than 5% by mass %.

(Stabilized Zirconia Particles)

The stabilized zirconia particles are particulate stabilized zirconia. The average particle diameter of the stabilized zirconia particles is preferably 2 μm or less, more preferably 1 μm or less, still more preferably 0.6 μm or less, particularly preferably 0.5 μm or less, and especially preferably 0.4 μm or less. The average particle diameter of the stabilized zirconia particles is preferably 0.3 μm or more, more preferably 0.33 μm or more, and still more preferably 0.35 μm or more. When the average particle diameter of the stabilized zirconia particles is 2 μm or less, it is easy to obtain a sintered body having a high sintered density. When the average particle diameter is 0.3 μm or more, the stabilized zirconia particles are superior in productivity.

The average particle diameter of the stabilized zirconia particles is a value measured by the same method as that by which the average particle diameter of the fluorescent agent is measured.

The specific surface area of the stabilized zirconia particles is preferably 5 $m^2/g$ or more, more preferably 6 $m^2/g$ or more, still more preferably 7 $m^2/g$ or more, particularly preferably 7.5 $m^2/g$ or more, and especially preferably 8 $m^2/g$ or more. The specific surface area of the stabilized zirconia particles is preferably 15 $m^2/g$ or less, more preferably 13 $m^2/g$ or less, still more preferably 11 $m^2/g$ or less, particularly preferably 10 $m^2/g$ or less, and especially preferably 9 $m^2/g$ or less.

When the specific surface area of the stabilized zirconia particles is within the above numerical range, it is easy to obtain a sintered body having a high sintered density.

The specific surface area of the stabilized zirconia particles refers to a value obtained by the method described in Examples.

The stabilized zirconia constituting the stabilized zirconia particles in the present embodiment may be completely stabilized zirconia or partially stabilized zirconia.

The stabilizer contained in the stabilized zirconia particles is preferably one or more compounds selected from the group consisting of $Y_2O_3$, $Sc_2O_3$, $CaO$, $MgO$, $Er_2O_3$, and $Yb_2O_3$.

Especially, the stabilizer is preferably $Y_2O_3$, and the content of $Y_2O_3$ based on the entire amount of the stabilized zirconia particles is preferably 1.8 mol % or more and 7 mol % or less. When the content of $Y_2O_3$ is 1.8 mol % or more and 7 mol % or less, the stabilized zirconia particles are particles composed of partially stabilized zirconia. When the content of $Y_2O_3$ is 1.8 mol % or more and 7 mol % or less, the stabilized zirconia sintered body is more enhanced in mechanical strength.

The stabilized zirconia particles can be produced by a conventionally known method. The stabilized zirconia particles can be produced, for example, by the method disclosed in Japanese Patent No. 6184174 (JP-A-2014-234455).

The zirconia powder may contain aluminum oxide as a sintering aid and/or as a structural material. When the content of the aluminum oxide is relatively small, the aluminum oxide mainly functions as a sintering aid, whereas when the content of the aluminum oxide is relatively large, the aluminum oxide mainly functions as a structural material. When the content of the aluminum oxide is between these contents, the aluminum oxide mainly functions as a sintering aid and also as a structural material.

When the zirconia powder contains aluminum oxide as a structural material, the content of the aluminum oxide is preferably 2 mol % or more and less than 50 mol % where the entire amount of the zirconia powder is 100 mol %.

When the zirconia powder contains aluminum oxide within the above numerical range, the stabilized zirconia sintered body obtained by sintering the zirconia powder can be improved in characteristics such as strength by combination with aluminum oxide (alumina). That is, when the content of the aluminum oxide is within the above range, the stabilized zirconia sintered body obtained by sintering the zirconia powder can have both high strength due to the combination with aluminum oxide (alumina) and fluorescence characteristics.

When the zirconia powder contains aluminum oxide as a structural material, the content of the aluminum oxide is preferably 3 mol % or more, more preferably 5 mol % or more, still more preferably 10 mol % or more, particularly preferably 15 mol % or more, especially preferably 20 mol % or more, and extremely preferably 22 mol % or more where the entire amount of the zirconia powder is 100 mol %.

When the zirconia powder contains aluminum oxide as a structural material, the content of the aluminum oxide is preferably 40 mol % or less, more preferably 35 mol % or more, still more preferably 30 mol % or less, particularly preferably 27 mol % or less, especially preferably 25 mol % or less, and extremely preferably 24 mol % or less where the entire amount of the zirconia powder is 100 mol %.

In order to make the zirconia powder contain aluminum oxide, it is preferable to use an alumina powder. The zirconia powder containing aluminum oxide can be obtained by mixing an alumina powder, stabilized zirconia particles, and a fluorescent agent using a commercially available mixer. If necessary, a commercially available pulverizer may be used. The purity of the alumina powder is 90% or more, preferably 95% or more, and more preferably 98% or more. The particle diameter of the alumina powder is not particularly limited, and the average particle diameter is preferably 0.4 μm or more and 30 μm or less. The alumina powder preferably has a particle diameter similar to that of the stabilized zirconia powder before sintering.

When the zirconia powder contains aluminum oxide as a sintering aid, the content of the aluminum oxide is preferably 0.01 mol % or more and 0.4 mol % or less where the entire amount of the zirconia powder is 100 mol %.

When the zirconia powder contains aluminum oxide within the above numerical range, the sinterability of the zirconia powder is improved, and the crystal structure is likely to be homogenized.

When the zirconia powder contains aluminum oxide as a sintering aid, the content of the aluminum oxide is preferably 0.01 mol % or more, more preferably 0.03 mol % or more, still more preferably 0.05 mol % or more, particularly preferably 0.07 mol % or more, especially preferably 0.1 mol % or more, and extremely preferably 0.11 mol % or more where the entire amount of the zirconia powder is 100 mol %.

When the zirconia powder contains aluminum oxide as a sintering aid, the content of the aluminum oxide is preferably 0.35 mol % or less, more preferably 0.3 mol % or less, still more preferably 0.25 mol % or less, particularly preferably 0.20 mol % or less, especially preferably 0.17 mol % or less, and extremely preferably 0.15 mol % or less where the entire amount of the stabilized zirconia sintered body is 100 mol %.

When the aluminum oxide is made to function as a sintering aid and also as a structural material, the content of the aluminum oxide is preferably 0.45 mol % or more, more preferably 0.5 mol % or more, still more preferably 0.6 mol % or more, particularly preferably 0.7 mol % or more, especially preferably 0.8 mol % or more, and extremely preferably 0.9 mol % or more where the entire amount of the zirconia powder is 100 mol %.

When the aluminum oxide is caused to function as a sintering aid and also as a structural material, the content of the aluminum oxide is preferably 1.9 mol % or less, more preferably 1.7 mol % or less, still more preferably 1.5 mol % or less, particularly preferably 1.4 mol % or less, especially preferably 1.2 mol % or less, and extremely preferably 1.1 mol % or less where the entire amount of the zirconia powder is 100 mol %.

In addition to or instead of aluminum oxide, the zirconia powder may contain sinterable ceramics, a thermosetting resin, or the like for the purpose of improving characteristics such as strength.

(Coloring Element)

The zirconia powder may contain one or more elements selected from the group consisting of Fe, V, Er, Mn, Co, Cr, Si, Ti, Zn, and Nb. When the zirconia powder contains one or more elements selected from the group consisting of Fe, V, Er, Mn, Co, Cr, Si, Ti, Zn, and Nb as a coloring element, a stabilized zirconia sintered body obtained by sintering the zirconia powder can be suitably colored.

The form of the coloring element is not particularly limited, and the coloring element can be added in the form of an oxide, a chloride, or the like. Specific examples of a colorant containing the coloring element include $Fe_2O_3$, $V_2O$, $Er_2O_3$, $MnO_2$, $Co_3O_4$, $Cr_2O_3$, $SiO_2$, $TiO_2$, ZnO, and $Nb_2O_5$.

As the fluorescent agent, specifically, those disclosed in Japanese Patent No. 6184174 (JP-A-2014-234455) can be used. The fluorescent agent can be produced by the method disclosed in Japanese Patent No. 6184174 (JP-A-2014-234455).

The zirconia powder can be obtained by mixing the stabilized zirconia particles and the fluorescent agent. As a more detailed method of mixing, it is preferable to disperse the materials in pure water or the like to form a slurry, and wet-mix the mixture. After the wet-mixing, it is preferable to dry the mixture and then size the mixture through a sieve or the like. The mixing is preferably mixing in a mode in which the stabilized zirconia particles and the fluorescent agent are not pulverized (a mode in which the average particle diameter and the crystallite diameter do not change).

However, the method for producing the zirconia powder is not limited to the method described above.

The zirconia powder according to the present embodiment has been described above.

[Method for Producing Stabilized Zirconia Sintered Body]

Hereinafter, one example of a method for producing a stabilized zirconia sintered body will be described. However, the method for producing a stabilized zirconia sintered body of the present invention is not limited to the following example.

The method for producing a stabilized zirconia sintered body according to the present embodiment comprises:

step A of preparing a zirconia powder, and step B of sintering the zirconia powder.

<Step A>

In the method for producing a stabilized zirconia sintered body according to the present embodiment, first, a zirconia powder is prepared (step A). As the zirconia powder, those described in the section of [Zirconia Powder] can be used.

Next, the zirconia powder is press-molded, as necessary. Press-molding is not particularly limited, and uniaxial pressing can be used. The pressing pressure is, for example, preferably 50 to 500 MPa, and more preferably 80 to 200 MPa.

<Step B>

Next, the zirconia powder is sintered (step B). As a result, a stabilized zirconia sintered body is obtained. The heat treatment temperature and time during the sintering are not particularly limited, and are preferably about 1400 to 1550° C. for about 1 to 5 hours. The heat treatment atmosphere is preferably air or an oxidizing atmosphere.

The method for producing the stabilized zirconia sintered body according to the present embodiment has been described above.

EXAMPLES

Hereinafter, the present invention will be described in detail with reference to Examples, but the present invention is not limited to the following Examples as long as the gist thereof is not deviated. The stabilized zirconia particles, the fluorescent agents, and the stabilized zirconia sintered bodies in Examples and Comparative Examples contain 1.3 to 2.5 mass % based on zirconium oxide (calculated by the following formula (X)) of hafnium oxide as an inevitable impurity.

([Mass of hafnium oxide]/([mass of zirconium oxide]+[mass of hafnium oxide]))×100(%) <Formula (X)>

[Preparation of Zirconia Powder and Stabilized Zirconia Sintered Body]

Example 1

Yttria-stabilized zirconia particles containing 4.0 mol % of $Y_2O_3$ were prepared.

Monoclinic zirconia containing 0.25 mass % of $TiO_2$ and having an average particle diameter of 5 μm and a crystallite diameter of 52 nm was prepared as a fluorescent agent.

Yttria-stabilized zirconia particles according to Example 1 were produced as follows.

Basic zirconium sulfate (containing 100 g of zirconium oxide) was dispersed in 1000 g of water to afford a basic zirconium sulfate slurry. In addition, an yttrium chloride solution having a concentration of 5% was weighed so as to be 4.0 mol % with respect to zirconia. While the basic zirconium sulfate slurry was stirred, the weighed yttrium chloride solution was added. As a result, a mixed solution was obtained.

Next, a 25% by weight sodium hydroxide aqueous solution was added to the mixed solution until the pH reached 13.5, affording a precipitate. Next, the produced precipitate was subjected to solid-liquid separation. The resulting solid was washed with water, and collected. Next, the collected solid was calcined at 1100° C. for 2 hours in the atmospheric air to afford yttria-stabilized zirconia particles.

Stabilized zirconia particles according to Examples 2 to 22 and Comparative Examples 1 to 5 were also produced in the same manner as the stabilized zirconia particles of Example 1 by changing the type and addition amount of the stabilizer.

The fluorescent agent (monoclinic zirconia) was produced as follows.

First, zirconium oxychloride was weighed so as to be 20 g in terms of zirconium oxide, and this was dissolved in ion-exchanged water to afford 500 g of a solution.

To this solution was added powdered sodium sulfate, and the temperature was raised to 98° C. to afford a slurry of basic zirconium sulfate. This slurry was subjected to solid-liquid separation, and the resulting solid basic zirconium sulfate was washed with ion-exchanged water. The basic zirconium sulfate washed with water was redispersed in ion-exchanged water to afford a basic zirconium sulfate slurry from which impurities had been removed (concentration of basic zirconium sulfate: 10% by weight in terms of zirconium oxide).

To this slurry, a titanium tetrachloride solution was added so as to be 0.25% by weight in terms of titanium oxide with respect to the entire amount of zirconium oxide-based powder. Subsequently, an ammonium hydroxide solution was added to adjust the pH of the slurry to 9.3. The obtained zirconium-based hydroxide was collected by solid-liquid separation, then washed with ion-exchanged water, and then calcined at 1400° C. for 2 hours to afford a fluorescent agent (zirconium oxide-based powder) according to Example 1.

The fluorescent agents according to Examples 2 to 22 and Comparative Examples 3 to 4 were also produced in the same manner as the fluorescent agent of Example 1.

300 g of the prepared yttria-stabilized zirconia particles and 0.3 g of the prepared fluorescent agent were dispersed in 450 g of pure water, slurried, wet-mixed, dried at 105° C. for 48 hours, and then sized through a 150 μm sieve. As described above, a zirconia powder according to Example 1 was obtained.

The obtained zirconia powder was uniaxially press-molded at a pressure of 98 MPa and held at 1450° C. for 2 hours in an electric furnace to afford a stabilized zirconia sintered body according to Example 1.

Example 2

A zirconia powder and a stabilized zirconia sintered body according to Example 2 were obtained in the same manner as in Example 1 except that the mixing amount of the fluorescent agent was changed from 0.3 g to 1.5 g.

Example 3

A zirconia powder and a stabilized zirconia sintered body according to Example 3 were obtained in the same manner as in Example 1 except that the mixing amount of the fluorescent agent was changed from 0.3 g to 3.0 g.

Example 4

A zirconia powder and a stabilized zirconia sintered body according to Example 4 were obtained in the same manner as in Example 1 except that monoclinic zirconia containing 0.25 mass % of $TiO_2$ and having an average particle diameter of 1 μm and a crystallite diameter of 52 nm was used as a fluorescent agent, and the mixing amount of the fluorescent agent was changed from 0.3 g to 1.5 g.

Example 5

A zirconia powder and a stabilized zirconia sintered body according to Example 5 were obtained in the same manner as in Example 1 except that monoclinic zirconia containing 0.25 mass % of $TiO_2$ and having an average particle diameter of 10 μm and a crystallite diameter of 52 nm was used as a fluorescent agent, and the mixing amount of the fluorescent agent was changed from 0.3 g to 1.5 g.

Example 6

A zirconia powder and a stabilized zirconia sintered body according to Example 6 were obtained in the same manner as in Example 1 except that yttria-stabilized zirconia particles containing 5.6 mol % of $Y_2O_3$ were used as stabilized zirconia particles, monoclinic zirconia containing 0.25 mass % of $TiO_2$ and having an average particle diameter of 5 μm and a crystallite diameter of 52 nm was used as a fluorescent agent, and the amount of the fluorescent agent mixed was changed from 0.3 g to 1.5 g.

Example 7

A zirconia powder and a stabilized zirconia sintered body according to Example 7 were obtained in the same manner as in Example 1 except that yttria-stabilized zirconia particles containing 7.0 mol % of $Y_2O_3$ were used as stabilized zirconia particles, monoclinic zirconia containing 0.25 mass % of $TiO_2$ and having an average particle diameter of 10 μm and a crystallite diameter of 52 nm was used as a fluorescent agent, and the amount of the fluorescent agent mixed was changed from 0.3 g to 1.5 g.

Example 8

A zirconia powder and a stabilized zirconia sintered body according to Example 8 were obtained in the same manner as in Example 1 except that yttria-stabilized zirconia particles containing 1.8 mol % of $Y_2O_3$ were used as stabilized zirconia particles, monoclinic zirconia containing 0.25 mass % of $TiO_2$ and having an average particle diameter of 10 μm and a crystallite diameter of 52 nm was used as a fluorescent agent, the mixing amount of the fluorescent agent was changed from 0.3 g to 0.9 g, and 0.75 g (0.29 mol %) of $Al_2O_3$ was further added when the materials were dispersed in pure water.

Example 9

A zirconia powder and a stabilized zirconia sintered body according to Example 9 were obtained in the same manner as in Example 1 except that yttria-stabilized zirconia particles containing 3.2 mol % of $Y_2O_3$ were used as stabilized zirconia particles, monoclinic zirconia containing 0.25 mass % of $TiO_2$ and having an average particle diameter of 10 μm and a crystallite diameter of 52 nm was used as a fluorescent agent, the mixing amount of the fluorescent agent was changed from 0.3 g to 0.9 g, and 0.3 g (0.12 mol %) of $Al_2O_3$ was further added when the materials were dispersed in pure water.

Example 10

A zirconia powder and a stabilized zirconia sintered body according to Example 10 were obtained in the same manner as in Example 1 except that yttria-stabilized zirconia particles containing 5.6 mol % of $Y_2O_3$ were used as stabilized zirconia particles, the mixing amount of the fluorescent agent was changed from 0.3 g to 1.5 g, and 0.0105 g (0.005 mol %) of $MnO_2$ was further added when the materials were dispersed in pure water.

Example 11

A zirconia powder and a stabilized zirconia sintered body according to Example 11 were obtained in the same manner as in Example 1 except that yttria-stabilized zirconia particles containing 5.6 mol % of $Y_2O_3$ were used as stabilized zirconia particles, the mixing amount of the fluorescent agent was changed from 0.3 g to 1.5 g, and 0.009 g (0.002 mol %) of $V_2O_5$ was further added when the materials were dispersed in pure water.

Example 12

A zirconia powder and a stabilized zirconia sintered body according to Example 12 were obtained in the same manner as in Example 1 except that yttria-stabilized zirconia particles containing 5.6 mol % of $Y_2O_3$ were used as stabilized zirconia particles, the mixing amount of the fluorescent agent was changed from 0.3 g to 1.5 g, and 0.015 g (0.004 mol %) of $Cr_2O_3$ was further added when the materials were dispersed in pure water.

Example 13

A zirconia powder and a stabilized zirconia sintered body according to Example 13 were obtained in the same manner as in Example 1 except that yttria-stabilized zirconia particles containing 5.6 mol % of $Y_2O_3$ were used as stabilized zirconia particles, the mixing amount of the fluorescent agent was changed from 0.3 g to 1.5 g, and 0.015 g (0.003 mol %) of $Co_3O_4$ was further added when the materials were dispersed in pure water.

Example 14

A zirconia powder and a stabilized zirconia sintered body according to Example 11 were obtained in the same manner as in Example 1 except that erbia-stabilized zirconia particles containing 3.1 mol % of $Er_2O_3$ were used as stabilized zirconia particles and the mixing amount of the fluorescent agent was changed from 0.3 g to 1.5 g. The erbia-stabilized zirconia particles were obtained by using an erbium chloride solution instead of the yttrium chloride solution in the method for producing yttria-stabilized zirconia particles of Example 1.

Example 15

A zirconia powder and a stabilized zirconia sintered body according to Example 15 were obtained in the same manner as in Example 1 except that scandia-stabilized zirconia particles containing 6.0 mol % of $Sc_2O_3$ were used as stabilized zirconia particles, monoclinic zirconia containing 0.40 mass % of $TiO_2$ and having an average particle diameter of 5 μm and a crystallite diameter of 52 nm was used as a fluorescent agent, and the mixing amount of the fluorescent agent was changed from 0.3 g to 3.0 g. The scandia-stabilized zirconia particles were obtained by using a scandium chloride solution instead of the yttrium chloride solution in the method for producing yttria-stabilized zirconia particles of Example 1.

Example 16

A zirconia powder and a stabilized zirconia sintered body according to Example 16 were obtained in the same manner as in Example 1 except that yttria and ytterbia-stabilized zirconia particles containing 3.0 mol % of $Y_2O_3$ and 1.0 mol % of $Yb_2O_3$ were used as stabilized zirconia particles and the mixing amount of the fluorescent agent was changed from 0.3 g to 1.5 g. The yttria and ytterbia-stabilized zirconia particles were obtained by adding an ytterbium chloride solution in addition to the yttrium chloride solution in the method for producing yttria-stabilized zirconia particles of Example 1.

Example 17

A zirconia powder and a stabilized zirconia sintered body according to Example 17 were obtained in the same manner as in Example 1 except that yttria-stabilized zirconia particles containing 2.0 mol % of $Y_2O_3$ were used as stabilized zirconia particles, monoclinic zirconia containing 0.40 mass % of $TiO_2$ and having an average particle diameter of 3 μm and a crystallite diameter of 52 nm was used as a fluorescent agent, the mixing amount of the fluorescent agent was changed from 0.3 g to 0.9 g, and 0.006 g (0.002 mol %) of $Fe_2O_3$ was further added when the materials were dispersed in pure water.

Example 18

A zirconia powder and a stabilized zirconia sintered body according to Example 18 were obtained in the same manner as in Example 1 except that yttria-stabilized zirconia particles containing 2.0 mol % of $Y_2O_3$ were used as stabilized zirconia particles, monoclinic zirconia containing 0.40 mass % of $TiO_2$ and having an average particle diameter of 10 μm and a crystallite diameter of 44 nm was used as a fluorescent agent, the mixing amount of the fluorescent agent was changed from 0.3 g to 1.5 g, 75.0 g (23.5 mol %) of $Al_2O_3$ was further added when the materials were dispersed in pure water, and the holding temperature in the electric furnace when the sintered body was obtained was adjusted to 1500° C.

Example 19

A zirconia powder and a stabilized zirconia sintered body according to Example 19 were obtained in the same manner as in Example 9 except that 0.21 mol of $SiO_2$ was added instead of $Al_2O_3$.

Example 20

A zirconia powder and a stabilized zirconia sintered body according to Example 20 were obtained in the same manner as in Example 9 except that 0.15 mol % of $TiO_2$ was added instead of $Al_2O_3$.

Example 21

A zirconia powder and a stabilized zirconia sintered body according to Example 21 were obtained in the same manner as in Example 9 except that 0.38 mol % of ZnO was added instead of $Al_2O_3$.

Example 22

A zirconia powder and a stabilized zirconia sintered body according to Example 22 were obtained in the same manner as in Example 9 except that 0.09 mol % of $Nb_2O_5$ was added instead of $Al_2O_3$.

Comparative Example 1

The yttria-stabilized zirconia particles prepared in Example 1 were uniaxially press-molded at a pressure of 98 MPa and held at 1450° C. for 2 hours in an electric furnace to afford a stabilized zirconia sintered body according to Comparative Example 1. The stabilized zirconia sintered body of Comparative Example 1 contains no fluorescent agent.

Comparative Example 2

Yttria and titania-stabilized zirconia particles containing 3.0 mole of $Y_2O_3$ and 0.10 mole of $TiO_2$ were uniaxially press-molded at a pressure of 98 MPa and held at 1450° C. for 2 hours in an electric furnace to afford a stabilized zirconia sintered body according to Comparative Example 2. The stabilized zirconia sintered body of Comparative Example 2 contains no fluorescent agent.

Comparative Example 3

A zirconia powder and a stabilized zirconia sintered body according to Comparative Example 3 were obtained in the same manner as in Example 1 except that monoclinic zirconia containing 0.15 masse of $TiO_2$ and having an average particle diameter of 2 μm and a crystallite diameter of 36 nm was used as a fluorescent agent, and the mixing amount of the fluorescent agent was changed from 0.3 g to 1.5 g.

Comparative Example 4

A zirconia powder and a stabilized zirconia sintered body according to Comparative Example 4 were obtained in the same manner as in Example 1 except that yttria-stabilized zirconia particles containing 5.6 mole of $Y_2O_3$ were used as stabilized zirconia particles, monoclinic zirconia containing 0.25 mass % of $TiO_2$ and having an average particle diameter of 10 μm and a crystallite diameter of 52 nm was used as a fluorescent agent, the mixing amount of the fluorescent agent was changed from 0.3 g to 1.5 g, and 0.27 g (0.07 mol %) of $Fe_2O_3$ was further added when the materials were dispersed in pure water.

Comparative Example 5

A zirconia powder and a stabilized zirconia sintered body according to Comparative Example 5 were obtained in the same manner as in Example 11 except that no fluorescent agent was added.

[Measurement of Crystallite Diameter of Fluorescent Agent]

The X-ray diffraction spectrum of each of the fluorescent agents used in Examples and Comparative Examples was obtained using an X-ray diffractometer ("RINT2500", manufactured by Rigaku Corporation). The measurement conditions were set as follows.

<Measurement Conditions>
Measuring apparatus: X-ray diffractometer (RINT2500, manufactured by Rigaku Corporation)
Radiation source: CuKα radiation source
Sampling interval: 0.02°
Scanning speed: 2θ=1.0°/min
Divergence slit (DS): 1°
Divergence vertical limit slit: 5 mm
Scatter slit (SS): 1°
Receiving slit (RS): 0.3 mm
Monochrome receiving slit: 0.8 mm
Tube voltage: 50 kV
Tube current: 300 mA Thereafter, the crystallite diameter was determined from the obtained peak using the Scherrer formula.

[Measurement of Average Particle Diameter of Fluorescent Agent]

The average particle diameter of each of the fluorescent agents used in Examples and Comparative Examples was measured using a laser diffraction type particle size distribution measuring device "SALD-2300" (manufactured by Shimadzu Corporation). More specifically, the average particle diameter was measured in a state where 0.15 g of a sample and 40 ml of a 0.2% sodium hexametaphosphate aqueous solution were placed in a 50-ml beaker, were dispersed by a desk ultrasonic cleaner "W-113" (manufactured by Honda Electronics Corporation) for 2 minutes, followed by placing the dispersed product in the device (laser diffraction type particle size distribution measuring device ("SALD-2300" manufactured by Shimadzu Corporation)).

[Measurement of Average Particle Diameter of Stabilized Zirconia Particles]

The average particle diameter of each the stabilized zirconia particles used in Examples and Comparative Examples was measured using a laser diffraction type particle size distribution measuring device "SALD-2300" (manufactured by Shimadzu Corporation). More specifically, the average particle diameter was measured in a state where 0.15 g of a sample and 40 ml of a 0.2% sodium hexametaphosphate aqueous solution were placed in a 50-ml beaker, were dispersed by a desk ultrasonic cleaner "W-113" (manufactured by Honda Electronics Corporation) for 2 minutes, followed by placing the dispersed product in the device (laser diffraction type particle size distribution measuring device ("SALD-2300" manufactured by Shimadzu Corporation)). The results are shown in Table 1.

[Measurement of Specific Surface Area of Stabilized Zirconia]

The specific surface area of each of the stabilized zirconia used in Examples and Comparative Examples was measured by the BET method using a specific surface area meter ("Macsorb" manufactured by Mountec). The results are shown in Table 1.

[Measurement of Fluorescence Intensity of Stabilized Zirconia Sintered Body]

Figure 3:
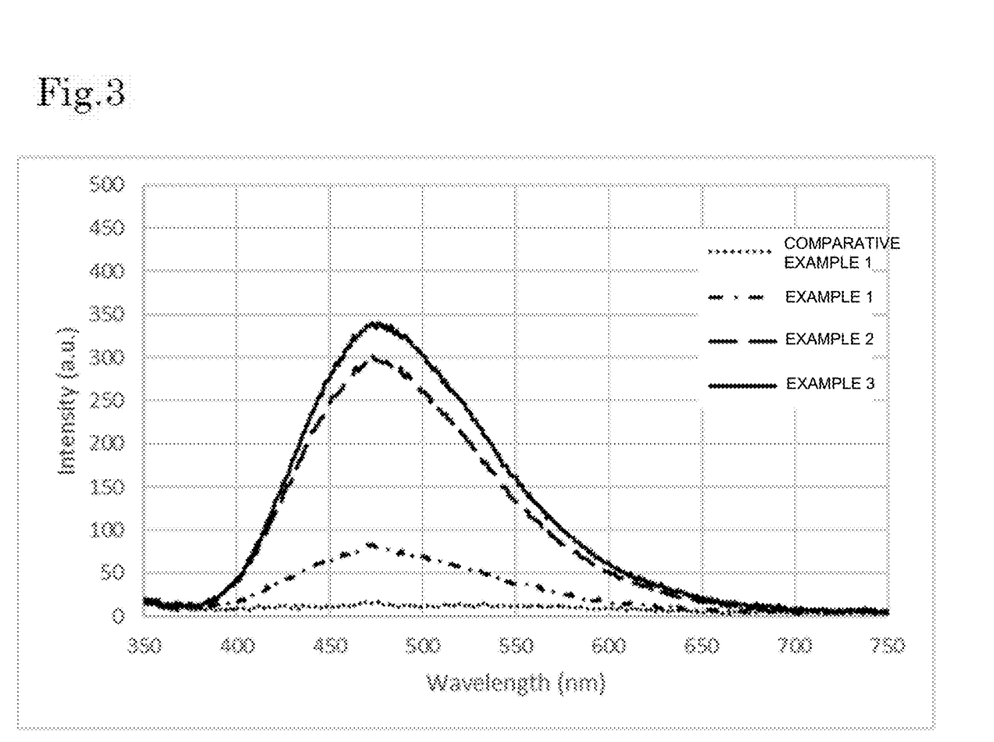
FIG. 3 is a graph showing a relationship between a fluorescence wavelength and a fluorescence intensity of the stabilized zirconia sintered bodies according to Examples 1 to 3 and Comparative Example 1.

For each of the stabilized zirconia sintered bodies of Examples and Comparative Examples, the fluorescence intensity at a wavelength at which the fluorescence intensity was the highest (the wavelength of an emission peak) when irradiated with light having a wavelength of 280 nm was measured using Quantaurus-QY C 11347 manufactured by Hamamatsu Photonics K.K. The results are shown in Table 1. Detailed conditions for the measurement of the fluorescence intensity are as follows. For Examples 1 to 3 and Comparative Example 1, a graph showing the fluorescence intensity at each fluorescence wavelength is shown in FIG. 3.

<Measurement Conditions>
Single Wavelength Mode of Quantum Yield Measurement
  Detector settings: exposure time: 500 ms, averaging: 20 times, wavelength range: 195.7 to 958.3 nm, Shutter close
  Color measurement setting: light source color measurement, automatic mode, color rendering evaluation indication item: Ra
  Lamp: 150 W Xe lamp (excited at 280 nm)

For the stabilized zirconia sintered body of Example 3, the excitation wavelength was varied from 260 nm to 350 nm, and the fluorescence wavelength (the wavelength of an emission peak) and the fluorescence intensity were measured. The results are shown in Table 2.

[Measurement of Three-Point Bending Strength of Stabilized Zirconia Sintered Body]

The three-point bending strength of the stabilized zirconia sintered body of each of Examples and Comparative Examples was measured in accordance with the three-point bending strength of JIS R 1601. The results are shown in Table 1.

[Measurement of Relative Sintered Density of Stabilized Zirconia Sintered Body]

The relative sintered density of the stabilized zirconia sintered body of each of Examples and Comparative Examples was determined according to the following formula (1).

The relative sintered density refers to a relative sintered density represented by the following formula (1):

$$\text{Relative sintered density (\%)} = (\text{sintered density}/\text{theoretical sintered density}) \times 100 \quad (1)$$

Here, the theoretical sintered density ($\rho_0$) is a value calculated by the following formula (2-1).

$$\rho 0 = 100/[(Y/3.987) + (100-Y)/\rho z] \quad (2\text{-}1)$$

However, $\rho z$ is a value calculated by the following formula (2-2).

$$\rho z = [124.25(100-X) + [\text{molecular weight of stabilizer}] \times X]/[150.5(100+X)A^2C] \quad (2\text{-}2)$$

Here, the molecular weight of the stabilizer is 225.81 when the stabilizer is $Y_2O_3$, 382.52 when the stabilizer is $Er_2O_3$, and 394.11 when the stabilizer is $Yb_2O_3$.

X and Y are a stabilizer concentration (mol %) and an alumina concentration (wt %), respectively. A and C are respectively values calculated by the following formulae (2-3) and (2-4).

$$A = 0.5080 + 0.06980X/(100+X) \quad (2\text{-}3)$$

$$C = 0.5195 - 0.06180X/(100+X) \quad (2\text{-}4)$$

In the formula (1), the theoretical sintered density varies depending on the composition of the powder. For example, the theoretical sintered density of yttria-containing zirconia is 6.117 g/cm$^3$ when the yttria content is 2 mol %, 6.098 g/cm$^3$ when the yttria content is 3 mol %, and 6.051 g/cm$^3$ when the yttria content is 5.5 mol % (when $Al_2O_3$=0% by weight).

When the stabilizer is $Sc_2O_3$, $\rho z$ is a value calculated by the following formula (3).

$$\rho z = -0.0402 \text{ (molar concentration of } Sc_2O_3) + 6.1294 \quad (3)$$

The sintered density was measured by the Archimedes method.

TABLE 1

| | Stabilized Zirconia | | | | | Zirconia Fluorescent Agent | |
|---|---|---|---|---|---|---|---|
| | Amount of $Y_2O_3$ mol % | Other addition amount mol % | Specific Surface Area m$^2$/g | Average Particle Diameter μm | Other additives (colorant, etc.) Addition Amount mol % | Addition Amount mass % | Amount of $TiO_2$ mass % |
| Example 1 | 4.0 | — | 8.3 | 0.36 | — | 0.1 | 0.25 |
| Example 2 | 4.0 | — | 8.3 | 0.36 | — | 0.5 | 0.25 |
| Example 3 | 4.0 | — | 8.1 | 0.36 | — | 1.0 | 0.25 |
| Example 4 | 4.0 | — | 8.2 | 0.36 | — | 0.5 | 0.25 |
| Example 5 | 4.0 | — | 8.2 | 0.36 | — | 0.5 | 0.25 |
| Example 6 | 5.6 | — | 8.4 | 0.37 | — | 0.5 | 0.25 |
| Example 7 | 7.0 | — | 8.5 | 0.37 | — | 0.5 | 0.25 |
| Example 8 | 1.8 | — | 7.5 | 0.46 | $Al_2O_3$ = 0.29 | 0.3 | 0.25 |
| Example 9 | 3.2 | — | 8.1 | 0.47 | $Al_2O_3$ = 0.12 | 0.3 | 0.25 |
| Example 10 | 5.6 | — | 8.5 | 0.37 | $MnO_2$ = 0.005 | 0.5 | 0.25 |
| Example 11 | 5.6 | — | 8.4 | 0.37 | $V_2O_5$ = 0.002 | 0.5 | 0.25 |
| Example 12 | 5.6 | — | 8.5 | 0.37 | $Cr_2O_3$ = 0.004 | 0.5 | 0.25 |
| Example 13 | 5.6 | — | 8.5 | 0.37 | $Co_3O_4$ = 0.003 | 0.5 | 0.25 |
| Example 14 | 0 | $Er_2O_3$ = 3.1 | 9.2 | 0.39 | — | 0.5 | 0.25 |
| Example 15 | 0 | $Sc_2O_3$ = 6.0 | 8.1 | 0.51 | — | 1.0 | 0.40 |
| Example 16 | 3.0 | $Yb_2O_3$ = 1.0 | 9.5 | 0.47 | — | 0.5 | 0.25 |
| Example 17 | 2.0 | — | 7.9 | 0.38 | $Fe_2O_3$ = 0.002 | 0.3 | 0.40 |
| Example 18 | 2.0 | — | 8.1 | 0.35 | $Al_2O_3$ = 23.5 | 0.5 | 0.40 |
| Example 19 | 3.2 | — | 7.5 | 0.39 | $SiO_2$ = 0.21 | 0.3 | 0.25 |
| Example 20 | 3.2 | — | 7.7 | 0.34 | $TiO_2$ = 0.15 | 0.3 | 0.25 |
| Example 21 | 3.2 | — | 7.6 | 0.38 | ZnO = 0.38 | 0.3 | 0.25 |
| Example 22 | 3.2 | — | 7.6 | 0.39 | $Nb_2O_5$ = 0.09 | 0.3 | 0.25 |
| Comparative Example 1 | 4.0 | — | 8.2 | 0.37 | — | — | — |
| Comparative Example 2 | 3.0 | — | 7.1 | 0.50 | — | — | — |
| Comparative Example 3 | 4.0 | — | 8.1 | 0.37 | — | 0.5 | 0.25 |

TABLE 1-continued

| | | | | | | | |
|---|---|---|---|---|---|---|---|
| Comparative Example 4 | 5.6 | — | 8.4 | 0.37 | $Fe_2O_3$ = 0.07 | 0.5 | 0.25 |
| Comparative Example 5 | 0 | $Er_2O_3$ = 3.1 | 9.2 | 0.39 | — | — | — |

| | Zirconia Fluorescent Agent | | | Sintered Body | | Fluorescence |
|---|---|---|---|---|---|---|
| | Crystallite Diameter nm | Average Particle Diameter μm | Relative Density % | Three-Point Bending Strength MPa | | Intensity at 280 nm Excitation — |
| Example 1 | 52 | 5 | 99.9 | 800 | | 83 |
| Example 2 | 52 | 5 | 99.8 | 800 | | 303 |
| Example 3 | 52 | 5 | 99.8 | 800 | | 340 |
| Example 4 | 52 | 1 | 99.6 | 800 | | 214 |
| Example 5 | 52 | 10 | 99.6 | 800 | | 300 |
| Example 6 | 52 | 5 | 99.8 | 600 | | 371 |
| Example 7 | 52 | 10 | 99.8 | 300 | | 352 |
| Example 8 | 52 | 10 | 99.8 | 1200 | | 398 |
| Example 9 | 52 | 10 | 99.8 | 1000 | | 375 |
| Example 10 | 52 | 10 | 99.8 | 600 | | 59 |
| Example 11 | 52 | 10 | 99.8 | 600 | | 112 |
| Example 12 | 52 | 10 | 99.8 | 600 | | 75 |
| Example 13 | 52 | 10 | 99.8 | 600 | | 68 |
| Example 14 | 52 | 10 | 99.8 | 1000 | | 128 |
| Example 15 | 44 | 5 | 99.7 | 700 | | 118 |
| Example 16 | 52 | 5 | 99.7 | 600 | | 273 |
| Example 17 | 44 | 3 | 99.8 | 1200 | | 207 |
| Example 18 | 44 | 10 | 99.8 | 1300 | | 282 |
| Example 19 | 45 | 3 | 99.7 | 1000 | | 358 |
| Example 20 | 45 | 3 | 99.7 | 1000 | | 339 |
| Example 21 | 45 | 3 | 99.7 | 1000 | | 347 |
| Example 22 | 45 | 3 | 99.7 | 1000 | | 344 |
| Comparative Example 1 | — | — | 99.9 | 800 | | Undetected |
| Comparative Example 2 | — | — | 99.0 | 1000 | | Undetected |
| Comparative Example 3 | 36 | 2 | 99.9 | 800 | | Undetected |
| Comparative Example 4 | 52 | 10 | 99.9 | 600 | | Undetected |
| Comparative Example 5 | — | — | 99.8 | 1000 | | Undetected |

TABLE 2

| Excitation Wavelength (nm) | Fluorescence Wavelength (nm) | Fluorescence Intensity (a.u.) |
|---|---|---|
| 260 | 473 | 134 |
| 270 | 476 | 241 |
| 280 | 474 | 380 |
| 290 | 473 | 523 |
| 300 | 477 | 598 |
| 310 | 478 | 599 |
| 320 | 481 | 495 |
| 330 | 476 | 316 |
| 340 | 486 | 157 |
| 350 | 473 | 72 |

The invention claimed is:

1. A stabilized zirconia sintered body comprising a fluorescent agent containing zirconium and titanium, wherein
the stabilized zirconia sintered body exhibits fluorescence in response to an irradiation with light including light having a wavelength of 250 nm or more and 380 nm or less, and
the fluorescent agent has a crystallite diameter of 40 nm or more and 65 nm or less.

2. The stabilized zirconia sintered body according to claim 1, wherein
the stabilized zirconia sintered body contains stabilized zirconia, and
a content of the fluorescent agent is 0.01 mass % or more and 5 mass % or less where an entire amount of the stabilized zirconia is 100 mass %.

3. The stabilized zirconia sintered body according to claim 2, wherein the content of the fluorescent agent is 0.1 mass % or more and 2 mass % or less where the entire amount of the stabilized zirconia is 100 mass %.

4. The stabilized zirconia sintered body according to claim 1, wherein the stabilized zirconia sintered body emits light having an emission peak in a wavelength region of 400 nm or more and less than 600 nm in response to an irradiation with light including light having a wavelength of 250 nm or more and 380 nm or less.

5. The stabilized zirconia sintered body according to claim 1, wherein the fluorescent agent contains 90 mass % or more of zirconium oxide and 0.1 mass % or more and 5 mass % or less of titanium oxide where an entire amount of the fluorescent agent is 100 mass %.

6. The stabilized zirconia sintered body according to claim 1, wherein the stabilized zirconia sintered body has a relative sintered density of 99.5% or more.

7. The stabilized zirconia sintered body according to claim 1, wherein
the stabilized zirconia sintered body comprises a stabilizer, and
the stabilizer is one or more compounds selected from the group consisting of $Y_2O_3$, $Sc_2O_3$, CaO, MgO, $Er_2O_3$, and $Yb_2O_3$.

8. The stabilized zirconia sintered body according to claim 7, wherein
the stabilized zirconia sintered body comprises stabilized zirconia,
the stabilizer is $Y_2O_3$, and
a content of $Y_2O_3$ based on the entire amount of the stabilized zirconia is 1.8 mol % or more and 7 mol % or less.

9. The stabilized zirconia sintered body according to claim 1, wherein
the stabilized zirconia sintered body contains aluminum oxide, and
a content of the aluminum oxide is 2 mol % or more and less than 50 mol % where an entire amount of the stabilized zirconia sintered body is 100 mol %.

10. The stabilized zirconia sintered body according to claim 1, wherein the stabilized zirconia sintered body contains one or more elements selected from the group consisting of Fe, V, Er, Mn, Co, Cr, Si, Ti, Zn, and Nb.

11. A zirconia powder comprising:
stabilized zirconia particles, and
a fluorescent agent containing zirconium and titanium, wherein
a content of the fluorescent agent is 0.01 mass % or more and 5 mass % or less where an entire amount of the stabilized zirconia particles is 100 mass %, and
the fluorescent agent has a crystallite diameter of 40 nm or more and 65 nm or less.

12. The zirconia powder according to claim 11, wherein the content of the fluorescent agent is 0.1 mass % or more and 2 mass % or less where the entire amount of the stabilized zirconia particles is 100 mass %.

13. The zirconia powder according to claim 11, wherein the fluorescent agent contains 90 mass % or more of zirconium oxide and 0.1 mass % or more and 5 mass % or less of titanium oxide where an entire amount of the fluorescent agent is 100 mass %.

14. The zirconia powder according to claim 11, wherein the fluorescent agent has an average particle diameter of 1 μm or more and 20 μm or less.

15. The zirconia powder according to claim 11, wherein
the zirconia powder contains aluminum oxide, and
a content of the aluminum oxide is 2 mol % or more and less than 50 mol % where an entire amount of the zirconia powder is 100 mol %.

16. The zirconia powder according to claim 11, wherein
the zirconia powder contains a stabilizer, and
the stabilizer is one or more compounds selected from the group consisting of $Y_2O_3$, $Sc_2O_3$, CaO, MgO, $Er_2O_3$, and $Yb_2O_3$.

17. The zirconia powder according to claim 16, wherein
the stabilizer is $Y_2O_3$, and
a content of $Y_2O_3$ based on the entire amount of the stabilized zirconia particles is 1.8 mol % or more and 7 mol % or less.

18. The zirconia powder according to claim 11, wherein the zirconia powder contains one or more elements selected from the group consisting of Fe, V, Er, Mn, Co, Cr, Si, Ti, Zn, and Nb.

\* \* \* \* \*